United States Patent [19]
Miura et al.

[11] Patent Number: 5,293,625
[45] Date of Patent: Mar. 8, 1994

[54] SIGNAL SELECTING CIRCUIT WHICH SELECTIVELY OUTPUTS PREDETERMINED SIGNAL TO HOST COMPUTER COMPATIBLE WITH PLURALITY OF COMPUTER HARDWARE TYPES AND DISK DRIVE HAVING SUCH SIGNAL SELECTING CIRCUIT

[75] Inventors: Tohru Miura, Mitaka; Hiroshi Tsuyuguchi, Tokyo; Shozo Touma, Kokubunji, all of Japan

[73] Assignee: TEAC Corporation, Japan

[21] Appl. No.: 763,182

[22] Filed: Sep. 20, 1991

[30] Foreign Application Priority Data

Sep. 25, 1990 [JP] Japan .................................. 2-255902

[51] Int. Cl.⁵ .............................................. G11B 33/10
[52] U.S. Cl. .............................. 395/500; 364/DIG. 2; 360/69; 360/137
[58] Field of Search ............................ 395/425, 500; 364/200 MS, 900 MS; 360/69, 137

[56] References Cited

U.S. PATENT DOCUMENTS

| | | | |
|---|---|---|---|
| 4,896,262 | 1/1990 | Wayama et al. | 395/500 |
| 5,121,492 | 6/1992 | Saville, III et al. | 395/500 |
| 5,151,985 | 9/1992 | Sander et al. | 395/500 |

Primary Examiner—David L. Robertson
Attorney, Agent, or Firm—Andrus, Sceales, Starke & Sawall

[57] ABSTRACT

A disk drive connected to a host computer compatible with a plurality of computer hardware types can automatically transmit one desired control signal to the host computer, the desired control signal corresponding to a computer hardware type which is being used for the host computer. The disk drive may use a signal transmitted from the host computer which represents a storage capacity of a disk used for the disk drive.

7 Claims, 9 Drawing Sheets

FIG.8

| CASE | INPUT SIGNAL | | OPERATION MODE | | |
|---|---|---|---|---|---|
| | HD/$\overline{ND}$ | 2.0/$\overline{1.6MB}$ | STORAGE CAPACITY (BYTE) | $\overline{DC}$/$\overline{RDY}$ (OUTPUT SIGNAL) | MOTOR ROTATIONAL FREQUENCY (rpm) |
| I | H | H | 2.0MB | $\overline{DC}$ | 300 |
| II | H | L | 1.6MB | $\overline{RDY}$ | 360 |
| III | L | H | 1.0MB | $\overline{DC}$ | 300 |
| IV | L | L | 1.0MB | $\overline{RDY}$ | 300 |

FIG.9

| TERMINAL NO. | SIGNAL NAME | TERMINAL NO. | SIGNAL NAME | I/O |
|---|---|---|---|---|
| 1 | NC | 2 | HD IN/HD OUT/DISK CHANGE/OPEN | I/O |
| 3 | NC | 4 | IN US/HD OUT/DISK CHANGE/OPEN | I/O |
| 5 | NC | 6 | DRIVE SELECT 3 | INPUT |
| 7 | 0V | 8 | INDEX | OUTPUT |
| 9 | 0V | 10 | DRIVE SELECT 0 | INPUT |
| 11 | 0V | 12 | DRIVE SELECT 1 | INPUT |
| 13 | 0V | 14 | DRIVE SELECT 2 | INPUT |
| 15 | 0V | 16 | MOTOR ON | INPUT |
| 17 | 0V | 18 | DIRECTION SELECT | INPUT |
| 19 | 0V | 20 | STEP | INPUT |
| 21 | 0V | 22 | WRITE DATA | INPUT |
| 23 | 0V | 24 | WRITE GATE | INPUT |
| 25 | 0V | 26 | TRACK 00 | OUTPUT |
| 27 | 0V | 28 | WRITE PROTECT | OUTPUT |
| 29 | 0V | 30 | READ DATA | OUTPUT |
| 31 | 0V | 32 | SIDE ONE SELECT | INPUT |
| 33 | 0V | 34 | DISK CHANGE/READY | OUTPUT |

SIGNAL SELECTING CIRCUIT WHICH SELECTIVELY OUTPUTS PREDETERMINED SIGNAL TO HOST COMPUTER COMPATIBLE WITH PLURALITY OF COMPUTER HARDWARE TYPES AND DISK DRIVE HAVING SUCH SIGNAL SELECTING CIRCUIT

BACKGROUND OF THE INVENTION

The present invention relates generally to a signal selecting circuit, provided in a disk drive, which outputs a predetermined signal to a host computer and the disk drive having such a signal selecting circuit, and more particularly to a signal selecting circuit which selectively outputs a predetermined signal to a host computer compatible with a plurality of computer hardware types and a disk drive having such a signal selecting circuit.

In a conventional computer system comprising a so-called floppy disk drive (abbreviated FDD hereinafter), an interface connected to the FDD, and a host computer connected to the interface, the host computer judges if it can access the FDD by means of detecting either a ready signal (abbreviated RDY signal hereinafter) or a disk change signal (abbreviated DC signal hereinafter). Hereupon, the term "RDY signal", as used herein, means a signal representing a floppy disk is loaded into the FDD and thus information can be recorded thereon and/or reproduced therefrom. On the other hand, the term "DC signal", as used herein, means a signal representing the floppy disk is ejected from the FDD. Whether the host computer detects the RDY signal or the DC signal is predetermined by a hardware type of the host computer. For example, an NEC PC9801 detects the RDY signal, and an IBM PC/AT detects the DC signal. Jumper lines or short bars (strap pins) are provided in the FDD, and consequently the FDD outputs the signal corresponding to the hardware type of the host computer thereto via the jumper line (or the short bar) and the interface.

A storage capacity of a floppy disk used in the FDD is also predetermined by the hardware used in the host computer. For example, a high density type (2HD) disk having a storage capacity of 1.6 MB and/or a normal density type (2DD) disk having a storage capacity of 1.0 MB, before the disk is formatted, is used for the host computer if it is the NEC PC9801. On the other hand, a high density type (2HD) disk having a storage capacity of 2.0 MB and/or a normal density type (2DD) disk having a storage capacity of 1.0 MB, before the disk is formatted, is used for the host computer if it is the IBM PC/AT. Incidentally, if the FDD uses the 2.0 MB disk, the FDD is set in a 2.0 mode. Likewise, if the FDD uses the 1.6 MB disk, the FDD is set in a 1.6 mode, and if the FDD uses the 1.0 MB disk, the FDD is set in a 1.0 mode. In addition, for example, a term "2.0/1.0MB" means that the FDD has two modes so that it can be selectively set in the 2.0 mode or the 1.0 mode.

However, a host computer compatible with a plurality of computer hardware types, such as the NEC PC9801 and the IBM PC/AT, has been increasingly required. The FDD which can only output the RDY signal or the DC signal cannot be used for such a host computer. Additionally, a "2.0/1.6/1.0 MB" FDD which can be selectively set in one of the three modes is necessary. Although the 2.0/1.6/1.0 MB FDD has been already on sale, the FDD which has a signal selecting circuit which selectively outputs the RDY signal or the DC signal has not been developed yet. In a 2.0/1.6/1.0 MB FDD, the 2HD mode and the 2DD mode are switched by detecting the presence of a discriminating hole in the disk. Moreover, the 2.0 mode and the 1.6 mode are switched based on an external signal supplied from the host computer. However, since the FDD can only output the RDY signal, it cannot communicate with a host computer using a IBM PC/AT type. On the other hand, a computer system in which the FDD simultaneously outputs both the RDY signal and the DC signal to the host computer and the host computer selects either signal has been proposed. However, this computer system also has a disadvantage in that, since it is generally necessary to provide an extra output terminal for the FDD so as to simultaneously output both RDY signal and DC signal, the FDD cannot be compatible with the conventional interface. As a result, the computer system is made expensive and has complicated hardware.

SUMMARY OF THE INVENTION

Accordingly, it is a general object of the present invention to provide a novel and useful signal selecting circuit and a disk drive having such a signal selecting circuit.

The more specific object of the present invention is to provide a disk drive having a relatively simple construction which can communicate with a host computer compatible with a plurality of computer hardware types and a signal selecting circuit used in the disk drive.

According to one feature of the present invention, a disk drive connected to a host computer compatible with a plurality of computer hardware types comprises recording/reproducing means for recording information on one of the plural kinds of disks which respectively have storage capacities corresponding to a plurality of computer hardware types, and/or for reproducing information therefrom, signal outputting means for outputting plural kinds of control signals to the host computer, each of the plural kinds of control signals respectively corresponding to one of the plurality of computer hardware types and representing whether or not the recording/reproducing means can be used, and signal selecting means, provided between the signal outputting means and the host computer, for automatically selecting one of the plural kinds of control signals output from the signal outputting means which corresponds to one of the computer hardware types which is being used in the host computer.

According to another feature of the present invention, a disk drive connected to the host computer compatible with at least a first hardware type and a second hardware type comprises recording/reproducing means for recording information on one of a first disk and a second disk and/or reproducing information therefrom, the first disk having a first storage capacity corresponding to a first hardware type, and the second disk having a second storage capacity corresponding to a second hardware type, signal outputting means for outputting a first signal corresponding to the first hardware type and a second signal corresponding to the second hardware type, the first signal and second signal respectively representing whether or not the recording/reproducing means can be used, and signal selecting means, provided between the signal outputting means and the host computer, for automatically selecting one of the first control signal and the second control signal in response to a mode switching signal output from the host computer which represents whether the host computer requires the first disk or the second disk.

According to still another feature of the present invention, a signal selecting circuit used for a disk drive connected to a host computer compatible with a plurality of computer hardware types comprises signal outputting means for outputting plural kinds of control signals to the host computer, each of the plural kinds of control signals respectively corresponding to one of the plurality of computer hardware types and representing whether or not recording/reproducing means provided for the disk drive can be used, and the recording/reproducing means recording information on one of plural kinds of disks which respectively have storage capacities corresponding to the plurality of computer hardware types and/or reproducing information therefrom, and signal selecting means, connected to the signal outputting means and the host computer so as to be located therebetween, for automatically selecting one of the plural kinds of control signals output from the signal outputting means which corresponds to one of the computer hardware types which is being used in the host computer.

According to a further feature of the present invention, a signal selecting circuit used for a disk drive connected to a host computer compatible with at least a first hardware type and a second hardware type comprises signal outputting means for outputting a first signal corresponding to the first hardware type and a second signal corresponding to the second hardware type, the first signal and second signal respectively representing whether or not the recording/reproducing means provided for the disk drive can be used, the recording/reproducing means recording information on one of a first disk and a second disk and/or reproducing information therefrom, the first disk having a first storage capacity corresponding to a first hardware type, and the second disk having a second storage capacity corresponding to a second hardware type, and signal selecting means, provided between the signal outputting means and the host computer, for automatically selecting one of the first control signal and the second control signal in response to a mode switching signal output from the host computer which represents whether the host computer requires the first disk or the second disk.

According to the present invention, only one control signal is automatically selected and outputted to the host computer in accordance with a computer hardware type which is being used in the host computer. Therefore, the host computer can judge whether the recording/reproducing means can be used irrespective of the computer hardware type thereof. In addition, a disk drive compatible with a plurality of computer hardware types can be provided. Moreover, since the signal selecting circuit and the disk drive according to the present invention output only one control signal and needs no extra output terminal, they are compatible with the conventional interface.

BRIEF DESCRIPTION OF THE DRAWINGS

FIG. 8 is a table for explaining an operation of the FDD shown in FIG. 6; and

FIG. 9 is an example of a connector terminal number table of an interface shown in FIG. 1.

DETAILED DESCRIPTION OF THE PREFERRED EMBODIMENTS

Figure 1:
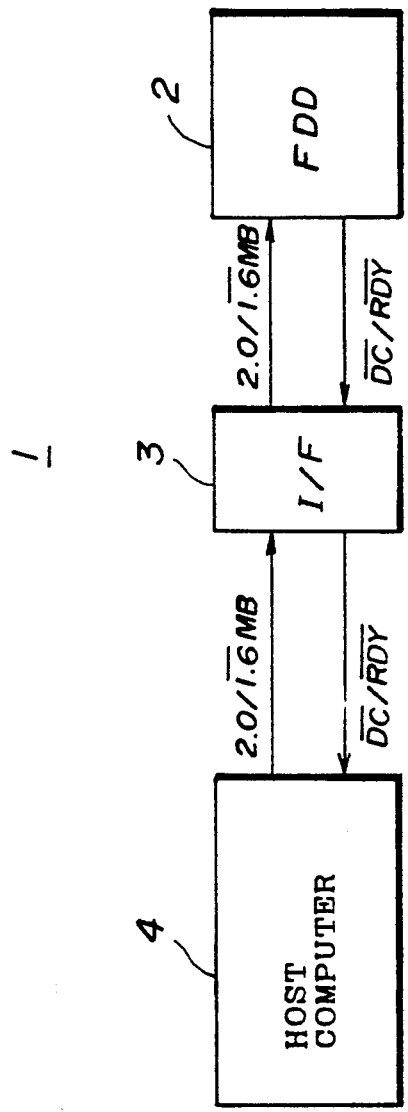
FIG. 1 is a block diagram of a computer system according to the present invention.

The computer system 1 according to the present invention comprises, as shown in FIG. 1, an FDD 2, an interface 3 connected the FDD 2, a host computer 4 connected to the interface 3. The FDD 2 can selectively set itself in one of the three modes of 2.0/1.6/1.0 MB. The interface 3 may be comprised of the conventional interface which will be described later. The host computer 4 is compatible with a plurality of computer hardware types, such as the NEC PC9801 and the IBM PC/AT. When the host computer 4 outputs a 2.0/1.6 MB signal to the FDD 2 via the interface 3, in response thereto, the FDD 2 automatically outputs a DC/RDY signal to the host computer 4. Hereupon, the term "2.0/1.6 MB signal", as used herein, means either a 2.0 MB signal or a 1.6 MB signal. The 2.0 MB signal means that the hardware type which is being used for the host computer 4 corresponds to a floppy disk having a storage capacity of 2.0 MB. The 1.6 MB signal means that the hardware type which is being used for the host computer 4 corresponds to a floppy disk having a storage capacity of 1.6 MB. The term "DC/RDY signal", as used herein, means either a DC signal or a RDY signal. The DC signal means that the hardware type which is being used for the host computer 4 corresponds to the DC signal. The RDY signal means that the hardware type which is being used for the host computer 4 corresponds to the RDY signal. Incidentally, as mentioned above, the DC signal corresponds to a floppy disk having a storage capacity of 2.0 MB, and the RDY signal corresponds to a floppy disk having a storage capacity of 1.6 MB.

Figure 2:
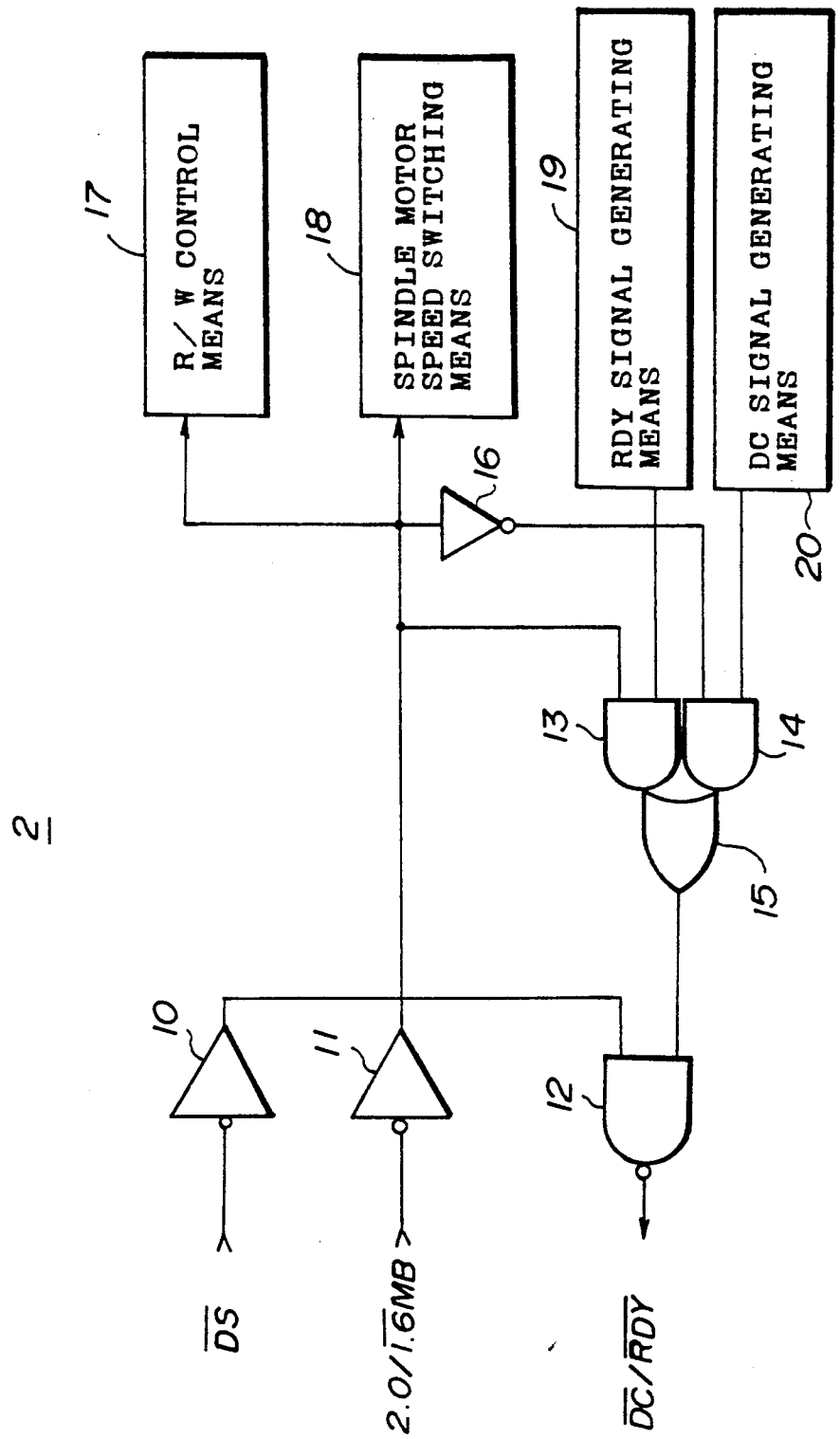
FIG. 2 is a basic block diagram showing one example of an FDD shown in FIG. 1.

The FDD 2 comprises, as shown in FIG. 2, inverters 10, 11 and 16, a NAND circuit 12, AND circuits 13 and 14, an OR circuit 15, read/write (R/W) control means 17, spindle motor speed switching means 18, RDY signal generating means 19 and DC signal generating means 20. A drive select (DS) signal is supplied to an input terminal of the inverter 10, and an output terminal of the inverter 10 is connected to one input terminal of the NAND circuit 12. The 2.0/1.6 MB signal is supplied to an input terminal of the inverter 11, and an output terminal of the inverter 11 is connected to one input terminal of the AND circuit 13, an input terminal of the inverter 16, an input terminal of the R/W control means 17 and an input terminal of the spindle motor speed switching means 18, respectively. The other input terminal of the AND circuit 13 is connected to the output terminal of the RDY signal generating means 19. One input terminal of the AND circuit 14 is connected to an output terminal of the inverter 16, and the other input terminal thereof is connected to an output terminal of the DC signal generating means 20. One input terminal of the OR circuit 15 is connected to an output terminal of the AND circuit 13, and the other input terminal thereof is connected to an output terminal of the AND circuit 14. An output terminal of the OR circuit 15 is connected to the other input terminal of the NAND circuit 12.

The DS signal, output from the host computer 4, means that the host computer 4 has selected this FDD 2. The DS signal is an active-low signal. The 2.0/1.6 MB signal is, as mentioned above, output from the host computer 4, and whether the active-high 2.0 MB signal or the active-low 1.6 MB signal is supplied to the FDD 2 is determined by the hardware type used by the host computer. The R/W control means 17 records information on the floppy disk having a storage capacity of 1.0 MB, 1.6 MB or 2.0 MB and/or reproduces information therefrom, based on the 2.0/1.6 MB signal. The spindle motor speed switching means 18 switches a speed of the spindle motor which rotates the disk at a rate based on the storage capacity of the disk determined by the 2.0/1.6 MB signal. The RDY signal generating means 19 generates the high-level RDY signal, and the DC signal generating means 20 generates the high-level DC signal. Incidentally, the NAND circuit 12 uses an open collector.

A description will now be given of the operation of the FDD 2 shown in FIG. 2 which generates the RDY/DC signal. When the inverter 10 outputs the low-level DS signal as the high-level DS signal to the NAND circuit 12, the one input terminal of the NAND circuit 12 goes to a high level.

On the other hand, when the host computer 4 supplies the high-level 2.0 MB signal to the inverter 11, the inverter 11 outputs the low-level signal to the AND circuit 13 and thus the one input terminal of the AND circuit 13 goes to a low level. In addition, when the inverter 11 outputs the low-level signal to the inverter 16, the inverter 16 outputs the high-level signal to the AND circuit 14 and thus the one input terminal of the AND circuit 14 becomes high level. In this way, only the AND circuit 14 can output the DC signal, output from the DC signal generating means 20, to the other input terminal of the NAND circuit 12. Since the one input terminal of the NAND circuit 12 is at a high level, the inverted DC signal is output from the NAND circuit 12.

If the host computer 4 supplies the low-level 1.6 MB signal to the inverter 11, the inverter 11 outputs the high-level signal to the AND circuit 13 and thus the one input terminal of the AND circuit 13 goes to a high level. In addition, when the inverter 11 outputs the high-level signal to the inverter 16, the inverter 16 outputs the low-level signal to the AND circuit 14 and thus the one input terminal of the AND circuit 14 becomes low level. In this way, only the AND circuit 13 can output the RDY signal, output from the RDY signal generating means 20, to the other input terminal of the NAND circuit 12. Since the one input terminal of the NAND circuit 12 is at a high level, the inverted RDY signal is output from the NAND circuit 12.

Thus, when the host computer 2 outputs the 2.0 MB signal, the FDD 2 outputs the DC signal. On the other hand, if the host computer 2 outputs the 1.6 MB signal, the FDD outputs the RDY signal.

Figure 3:
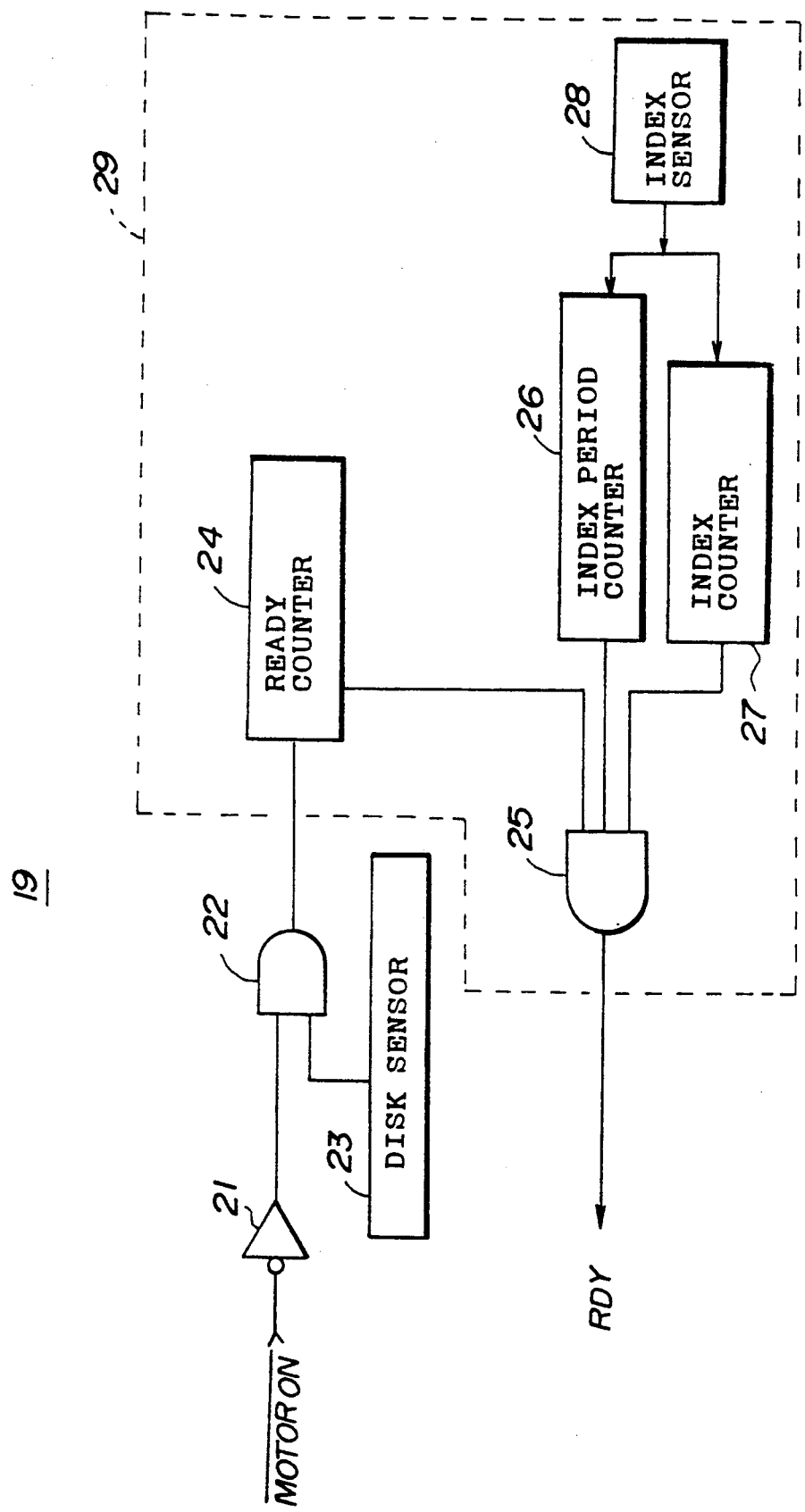
FIG. 3 is a basic block diagram showing one example of RDY signal generating means shown in FIG. 2.

Next, a description will be given of the RDY signal generating means 19 shown in FIG. 2 with reference to FIG. 3. The RDY signal generating means 19 comprises, as shown in FIG. 3, an inverter 21, AND circuits 22 and 25, a disk sensor 23, a ready counter 24, an index period counter 26, an index counter 27 and an index sensor 28. A active-low MOTOR ON signal is supplied to an input terminal of the inverter 21. One input terminal of the AND circuit 22 is connected to an output terminal of the inverter 21, and the other input terminal thereof is connected to an output terminal of the disk sensor 23. An output terminal of the AND circuit 22 is connected to an input terminal of the terminal of the ready counter 24. A first input terminal of the AND circuit 25 is connected to an output terminal of the ready counter 24, a second input terminal thereof is connected to an output terminal of the index period counter 26, and a third input terminal thereof is connected to an output terminal of the index counter 27. An output terminal of the index sensor 28 is connected to respective input terminals of the index counter 26 and the index counter 27.

The MOTOR ON signal, output from the host computer 4, controls the rotation of the spindle motor. The disk sensor 23 outputs an active-high disk signal when the disk is loaded into the FDD 2. The ready counter 24 latches the output of the AND circuit 22 until it counts a predetermined number of clocks (about 500 ms), and outputs it to the AND circuit 25. Thus, a predetermined time passes after the spindle motor begins to rotate. The index sensor 28 determines a start position of the track by detecting the rotating of the disk. Usually, it detects an index hole in the disk, however, it detects by using the motor if a 3.5 in disk which has no index hole is loaded in the FDD 2. The index period counter 26 outputs, in response to the output of the index sensor 28, a high level signal to the AND circuit 25 when a period of the index becomes constant and thus the rotational frequency of the motor becomes constant. The index counter 27 outputs, in response to the output of the index sensor 28, a high level signal to the AND circuit 25 when it counts the predetermined number of indexes. The AND circuit 25 outputs the RDY signal when the outputs of the ready counter 24, the index period counter 26, and the index counter become respectively at a high level. Thus, if the rotational frequency of the motor becomes constant after the predetermined time passes when the motor rotates and the predetermined number of indexes are detected, the RDY signal generating means 19 generates the RDY signal representing that information can be written down on a floppy disk and/or read out therefrom.

Figure 4:
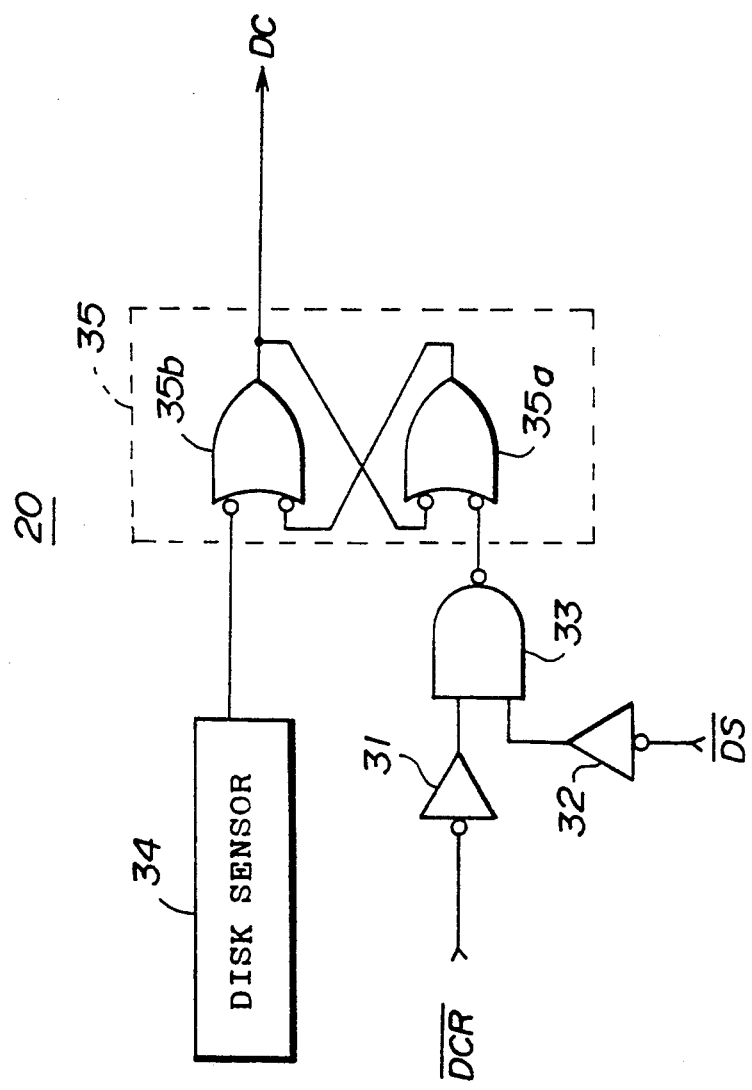
FIG. 4 is a basic block diagram showing one example of DC signal generating means shown in FIG. 2.

Next, a description will be given of the DC signal generating means 20 shown in FIG. 2 with reference to FIG. 4. The DC signal generating means 20 comprises, as shown in FIG. 4, inverters 31 and 32, a NAND circuit 33, a disk sensor 34 and R-S flip-flop 35. A disk change reset (DCR) signal is supplied to one input terminal of the NAND circuit 33, and the DS signal is supplied to the other input terminal thereof. The R-S flip-flop comprises two OR circuits 35a and 35b. One input terminal of the OR circuit 35a, which is a reset terminal of the R-S flip flop 35, is connected to an output terminal of the NAND circuit 33. AN output terminal of the disk sensor 34 is connected to one input terminal of the OR circuit 35b, which is a set input terminal of the R-S flip-flop.

The DCR signal, output from the host computer 4, generally uses a STEP signal for driving a step motor which moves a head. The active-low DCR signal and the DS signal are inverted and then input into the NAND circuit 33.

Figure 5:
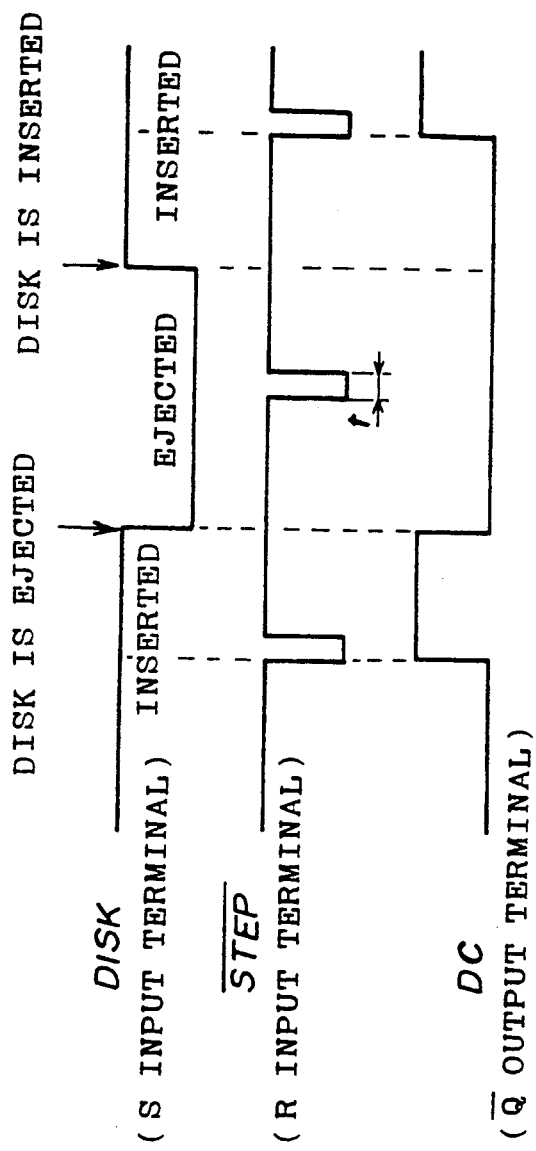
FIG. 5 is a time chart for explaining an operation of the DC signal generating means shown in FIG. 4.

A description will now be given of the operation of the DC signal generating means 20 with reference to FIG. 5. When the disk is inserted into the FDD 2 to make the DISK signal output from the disk sensor 34 at a high level and additionally the STEP signal used for the DCR signal generates a first step pulse, the DC signal output from a Q output terminal of the R-S flip-flop 35 assumes a high level. On the other hand, when the disk is ejected from the FDD 2, the DC signal goes to a low level. Even if the disk is inserted into the FDD 2, the DC signal remains low level until the STEP signal generates a subsequent step pulse. Incidentally, a pulse-width t of the step pulse of the STEP signal can be 3 s max.

Figure 6:
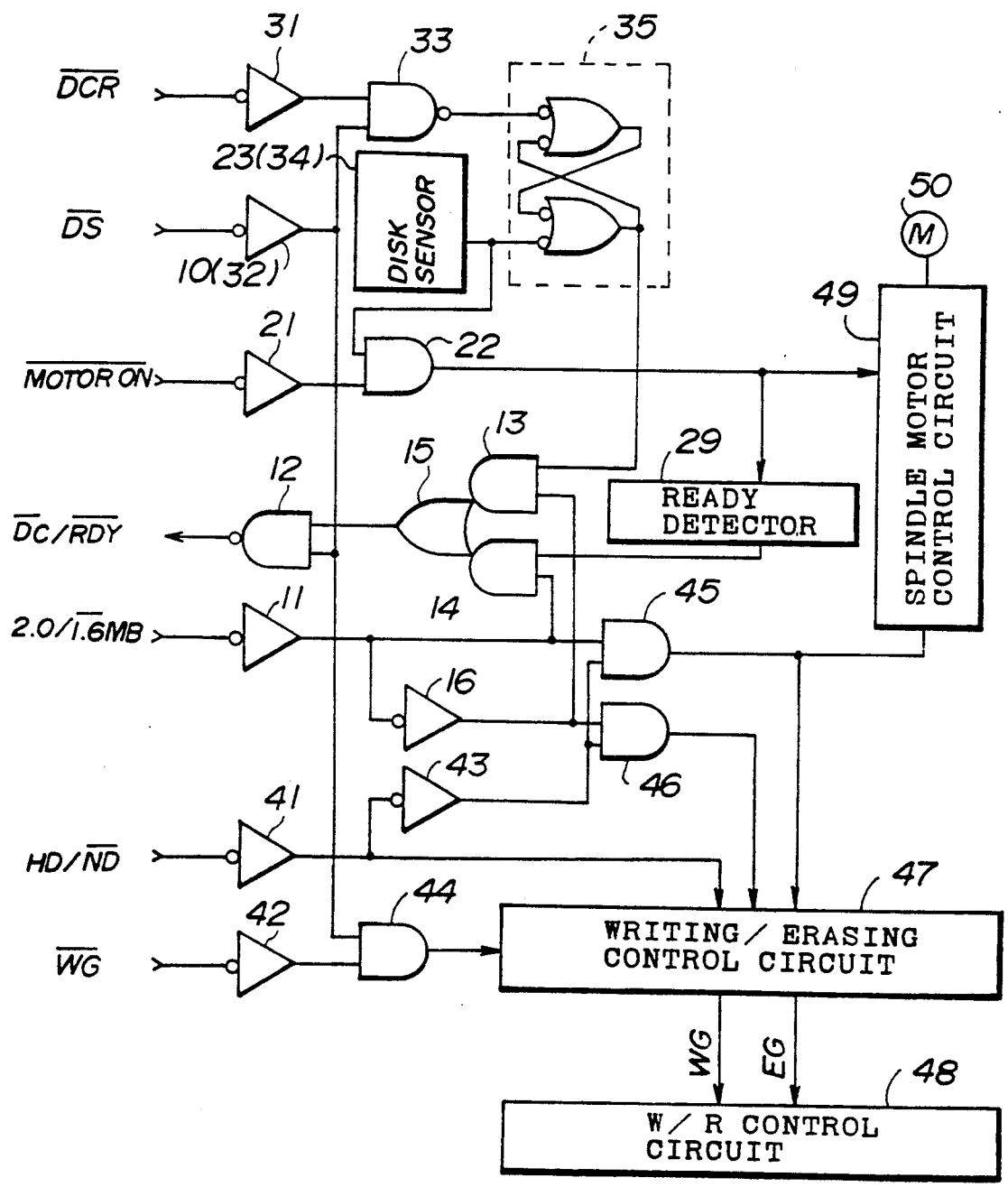
FIG. 6 is a detailed block diagram of the FDD shown in FIG. 2.

FIG. 6 shows a detailed block diagram of the FDD 2 according to the present invention. Incidentally, those elements which are the same as corresponding elements in FIGS. 2 to 4 are designated by the same reference numerals, and a description thereof will be omitted. The FDD 2 comprises inverters 41 to 43, AND circuits 44 to 46, writing/erasing control circuit 47, W/R control circuit 48, a spindle motor control circuit 49 and a spindle motor 50. A disk switching (HD/ND) signal is supplied to one input terminal of the inverter 41. The DS signal is supplied to the one input terminal of the AND circuit 44 via the inverter 10 (32), and a write gate (WG) signal is supplied to the other input terminal thereof via the inverter 42. An output terminal of the AND circuit 44 is connected to an input terminal of the writing/erasing control circuit 47. Each of one input terminals of the AND circuit 45 and 46 is respectively connected to an output terminal of the inverter 43. The 2.0/1.6 MB signal is supplied to the other input terminal of the AND circuit 45 via the inverter 11. The 2.0/1.6 MB signal is supplied to the other input terminal of the AND circuit 46 via the inverters 11 and 16. Respective output terminals of the AND circuits 45 and 46 are connected to input terminals of the writing/erasing circuit 47. In addition, the output terminals of the AND circuits 45 and 22 are further connected to the input terminals of the spindle motor control circuit 49. The writing/erasing control circuit 47 is connected to the W/R control circuit 48. The spindle motor control circuit 49 is connected to the spindle motor 50. Incidentally, the ready sensor 29 corresponds to elements enclosed by the dotted line shown in FIG. 3.

The HD/ND signal determines either a 2HD (2.0/1.6 MB) disk or 2DD (1.0 MB) disk. The R/W control circuit 48 records information on a disk and/or reproduces information therefrom by means of a R/W head. In addition, the R/W control circuit 48 erases a data on a guard band by means of an erase head to guarantee a guard band even if an off-track of the head occurs.

Figure 7:
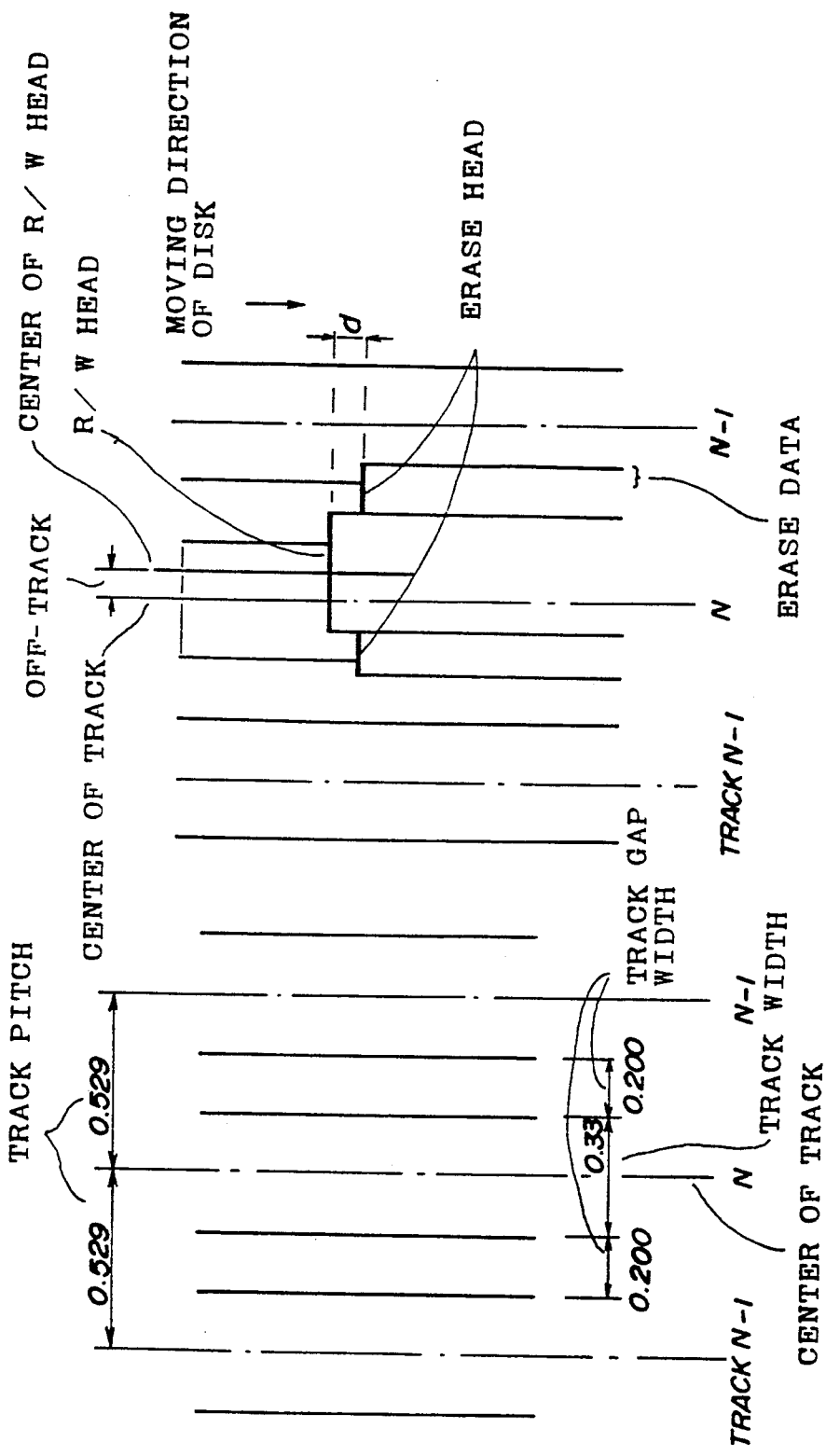
FIG. 7A is a view showing an arrangement of standard tracks of a 48 TPI floppy disk.
FIG. 7B is a view for explaining a writing of data while an off-track is being generated.

In order to make data on the disk compatible, the R/W head records, as shown in FIG. 7A, data on a disk with a track width of 330 m narrower than a track pitch 529 m. The guard band, which is beside the track, is a non-signal part where a data is erased. Since the head is actually off-track because of an offset between a center of the R/W head and that of the track, as shown in FIG. 7B, the R/W head records data even on the guard band. Accordingly, erase heads respectively erase data on the corresponding guard band, as disclosed by "Basic Knowledge of Floppy Disk Driver", pp.65–73, published by CQ publisher, and written by Shouji Takahashi. Since there is a distance "d", as shown in FIG. 7B, between the R/W head and the erase head, an erasing timing should be delayed in accordance with the distance "d". The WG signal determines a recording timing of the head. The writing/erasing control circuit 47 outputs the WG signal and an erasing gate (EG) signal to the W/R control circuit 48 in accordance with the WG signal transmitted via the AND circuit 44, a recording density of a disk and a hardware type used for the host computer 4. Incidentally, the EG signal determines the erasing timing of the erasing heads of the W/R control circuit 48. The W/R control circuit 48 writes down data on the disk and/or reads out data therefrom based on the WG signal and the EG signal. The R/W control means 17 shown in FIG. 2 may be comprised of the inverters 11, 16 and 41 to 43, the AND circuits 44 to 46, the writing/erasing control circuit 47 and the W/R control circuit 48.

The spindle motor control circuit 49 controls the rotational frequency of the spindle motor 50 based on the MOTOR ON signal, the recording density of the disk, the hardware type used for the host computer 4. For example, the spindle motor control circuit 49 establishes the rotational frequency of the spindle motor 50 at 360 rpm when the output of the AND circuit 45 becomes high level, and establishes it at 300 rpm when the output thereof becomes low level. The spindle motor speed switching means 18 shown in FIG. 2 may be comprised of the inverters 21, 41 and 43, the disk sensor 23 (34), the AND circuits 22 and 45, the spindle motor control circuit 49 and the spindle motor 50.

A description will now be given of the operation of the FDD 2 shown in FIG. 6 with reference to cases shown in FIG. 8. Incidentally, the DS signal and the MOTOR ON signal are respectively in the active state, conveniently.

In case "I", the HD signal representing a 2HD (2.0/1.6 MB) disk is supplied from the host computer 4 to the inverter 41, and the 2.0 MB signal representing a disk having a storage capacity of 2.0 MB is supplied therefrom to the inverter 11. That is, the host computer 4 requires a disk having a storage capacity of 2.0 MB. Since the one input terminal of the AND circuit 13 goes to a high level because of the inverters 11 and 16, the DC signal supplied to the other input terminal of the AND circuit 13 is output to the NAND circuit 12 via the OR circuit 15 and then output as the DC signal to the host computer 4. On the other hand, since the one input terminal of the AND circuit 45 goes to a low level because of the inverter 11, the spindle motor control circuit 49 establishes the rotational frequency of the spindle motor 50 at 300 rpm.

In case "II", the HD signal representing a 2HD (2.0/1.6 MB) disk is supplied from the host computer 4 to the inverter 41, and the 1.6 MB signal representing a disk having a storage capacity of 1.6 MB is supplied therefrom to the inverter 11. That is, the host computer 4 requires a disk having a storage capacity of 1.6 MB. Since the one input terminal of the AND circuit 14 goes to a high level because of the inverter 11, the RDY signal supplied to the other input terminal of the AND circuit 14 is output to the NAND circuit 12 via the OR circuit 15 and then output as the RDY signal to the host computer 4. On the other hand, since the one input terminal of the AND circuit 45 goes to a high level because of the inverter 11 and the other input terminal thereof goes to a high level because of the inverters 41 and 43, the spindle motor control circuit 49 establishes the rotational frequency of the spindle motor 50 at 360 rpm.

In case "III", the ND signal representing a 2DD (1.0 MB) disk is supplied from the host computer 4 to the inverter 41, and the 2.0 MB signal representing a disk having a storage capacity of 2.0 MB is supplied therefrom to the inverter 11. That is, the host computer 4 requires a disk having a storage capacity of 1.0 MB corresponding to a hardware type which corresponds to a disk having a storage capacity of 2.0 MB. Since the one input terminal of the AND circuit 13 goes to a high level because of the inverters 11 and 16, the DC signal supplied to the other input terminal of the AND circuit 13 is output to the NAND circuit 12 via the OR circuit 15 and then output as the DC signal to the host computer 4. On the other hand, since the one input terminal of the AND circuit 45 goes to a low level because of the inverter 11, the spindle motor control circuit 49 establishes the rotational frequency of the spindle motor 50 to 300 rpm.

In case "IV", the HD signal representing a 2DD (1.0 MB) disk is supplied from the host computer 4 to the inverter 41, and the 1.6 MB signal representing a disk having a storage capacity of 1.6 MB is supplied therefrom to the inverter 11. That is, the host computer 4 requires a disk having a storage capacity of 1.0 MB corresponding to a hardware type which corresponds to a disk having a storage capacity of 1.6 MB. Since the one input terminal of the AND circuit 14 goes to a high level because of the inverter 11, the RDY signal supplied to the other input terminal of the AND circuit 14 is output to the NAND circuit 12 via the OR circuit 15 and then output as the RDY signal to the host computer 4. On the other hand, since the one input terminal of the AND circuit 45 goes to a high level because of the inverters 41 and 43, the spindle motor control circuit 49 establishes the rotational frequency of the spindle motor 50 at 300 rpm. But, actually, the spindle motor control circuit 49 can flexibly change the rotational frequency of the spindle motor 50, for example at 360 rpm.

In the computer system 1 shown in FIG. 1 according to the present invention, the conventional interface shown in FIG. 9 can still be used. In the item of "SIGNAL NAME" at the terminal No.2, "HD IN" corresponds to the HD/ND signal. "HD OUT" is a signal indicating the presence of a HD discriminating hole output from the FDD 2. Incidentally, "NC" is an abbreviation of "NO CONNECTION".

Therefore, the DC/RDY signal may be output by using vacant terminals 1, 3, 5 or terminals 7, 9, 11 . . . Moreover, a terminal having No.2 or 4 may output the DC signal while a terminal having No.34 may output the RDY signal. Thus, since the DC signal or the RDY signal can be output by using the conventional interface, the computer system can be kept relatively inexpensive.

In addition, the AND circuits used in the above embodiments can be substituted by multiplexer ICs. In addition, the 2.0 MB signal and the 1.6 MB signal may be supplied to the FDD 2 via different terminals of the FDD 2. Moreover, a signal representing a hardware type of the host computer 4 may be substituted by the 2.0/1.6 MB signal, needless to say.

Thus, according to the present invention, the FDD automatically selects either the DC signal or the RDY signal based on the 2.0/1.6 signal supplied from the host computer and outputs it to the host computer. Therefore, the FDD which corresponds to the host computer compatible with a plurality of computer hardware types and is compatible with a conventional interface can be provided.

Further, the present invention is not limited these preferred embodiments, but various variations and modifications may be made without departing from the scope of the present invention.

What is claimed is:

1. A disk drive, connected to a host computer compatible with a plurality of computer hardware types, comprising:

recording/reproducing means for recording information on one of plural kinds of disks which respectively have storage capacities corresponding to one of the plurality of computer hardware types, and/or for reproducing information therefrom;

signal outputting means for outputting plural kinds of control signals to the host computer, each of the plural kinds of control signals respectively corresponding to the plurality of computer hardware types and representing whether or not said recording/reproducing means can be used; and signal selecting means, provided between said signal outputting means and the host computer, for automatically selecting one of the plural kinds of control signals output from said signal outputting means which corresponds to one of the computer hardware types which is being used in the host computer.

2. A disk drive, connected to the host computer compatible with at least a first hardware type and a second hardware type, comprising:

recording/reproducing means for recording information on one of a first disk and a second disk and/or reproducing information therefrom, the first disk having a first storage capacity corresponding to a first hardware type, and the second disk having a second storage capacity corresponding to a second hardware type;

signal outputting means for outputting a first signal corresponding to the first hardware type and a second signal corresponding to the second hardware type, the first signal and second signal respectively representing whether or not said recording/reproducing means can be used; and signal selecting means, provided between said signal outputting means and the host computer, for automatically selecting one of the first control signal and the second control signal in response to a mode switching signal output from the host computer which represents whether the host computer requires the first disk or the second disk.

3. A disk drive according to claim 2, wherein said disk drive further comprises motor control means for controlling a rotational frequency of a spindle motor which rotates the first disk and/or the second disk in response to the mode switching signal.

4. A disk drive according to claim 2, wherein said disk drive further comprises writing/erasing control means, coupled to said recording/reproducing means and the host computer, for generating a timing signal which determines a timing with which said recording/reproducing means records information, in response to the mode switching signal.

5. A disk drive according to claim 4, wherein the first disk and the second disk respectively have a plurality of tracks, each of which comprises a data area and a guard band, information being recorded/reproduced on/from the data area, the guard band being a non-signal area, and wherein said writing/erasing control means generating a timing signal which determines a timing with which information recorded on the guard band is erased.

6. A signal selecting circuit used for a disk drive, connected to a host computer compatible with a plurality of computer hardware types, comprising:

signal outputting means for outputting plural kinds of control signals to the host computer, each of the plural kinds of control signals respectively corresponding to one of the plurality of computer hardware types and representing whether or not recording/reproducing means provided for the disk drive can be used, and the recording/reproducing means recording information on one of plural kinds of disks, which respectively have storage capacities corresponding to the plurality of computer hardware types, and/or reproducing information therefrom; and signal selecting means, connected to said signal outputting means and the host computer so as to be located therebetween, for automatically selecting one of the plural kinds of control signals output from said signal outputting means which corresponds to one of the computer hardware types which is being used for the host computer.

7. A signal selecting circuit used for a disk drive, connected to a host computer compatible with at least a first hardware type and a second hardware type, comprising:

signal outputting means for outputting a first signal corresponding to the first hardware type and a second signal corresponding to the second hardware type, the first signal and second signal respectively representing whether or not the recording/reproducing means provided for the disk drive can be used, the recording/reproducing means recording information on one of a first disk and a second disk and/or reproducing information therefrom, the first disk having a first storage capacity corresponding to a first hardware type, and the second disk having a second storage capacity corresponding to a second hardware type; and signal selecting means, provided between said signal outputting means and the host computer, for automatically selecting one of the first control signal and the second control signal in response to a mode switching signal output from the host computer which represents whether the host computer requires the first disk or the second disk.

* * * * *